United States Patent Office 2,851,445
Patented Sept. 9, 1958

2,851,445

CARBONYL-EXCHANGE RESINS CONTAINING HYDRAZINO AND/OR OXYAMINO GROUPS

Herman S. Bloch, Skokie, Ill., assignor to Universal Oil Products Company, Des Plaines, Ill., a corporation of Delaware No Drawing. Application November 21, 1955
Serial No. 548,239

9 Claims. (Cl. 260—80.3)

This invention relates to a novel resinous composition of matter, the process for its preparation and the method of utilizing the resulting resinous composition in a process for separating organic compounds containing a carbonyl group from mixtures thereof with other organic compounds or for separating such carbonyl compounds from aqueous solutions or from aqueous mixtures containing the same. More specifically, the present invention relates to a resinous composition containing multiple hydrozino and/or oxyamino radicals, the method of producing the resinous composition by the copolymerization of one or more compounds containing hydrazino and/or oxyamino radicals with compounds of the same structure or with other unsaturated organic monomers and to the method of extracting and recovering carbonyl compounds from solutions of the same with non-reactive materials by passing the solution over the resinous composition and recovering, if desired, the carbonyl-containing compound from the resultant carbonyl-exchange resin.

The products of many synthetic reactions frequently contain varying proportions of carbonyl compounds present therein as the principal product of the process or as an impurity formed as a side reaction product and it frequently becomes desirable either to purify the product of such carbonyl-containing components or to recover the latter in a purified form as a side product of the principal process. Thus, in the process of oxidizing hydrocarbons with dilute oxygen to convert the hydrocarbon into an oxygen-containing organic compound, or in synthesizing such compounds from hydrogen, carbon monoxide and hydrocarbons, as for example in the well-known "Oxo" process, the final product of the process is frequently found to be a mixture of alcohols of various molecular weights and isomeric configurations, as well as aldehydes and ketones, also of varying molecular weights and in isomeric modifications. In order to separate the constituents of the mixed reaction product into chemical classes or types, it is often expedient to remove some of the components, either as a class or as individual fractions from the mixture in order to permit separation of the other components, for example by fractional distillation. The problem of separating, for example, the alcohols from the raw product of the oxidation reaction is substantially simplified by first removing the aldehydes and ketones from the oxidation product. Similarly, in the production of hydrocarbons and alcohols by means of the so-called "Fischer-Tropsch" process by the reaction of carbon monoxide with hydrogen over selected catalysts well-known for the process, a considerable proportion of the product sometimes consists of aldehydes and ketones which must necessarily be removed from the product in order to separate the alcohols and hydrocarbons desired as the end products.

Still another application of the present invention and use of the present carbonyl-exchange resins is the removal of aldehydes and/or ketones from gases contaminated therewith or from gases laden with vapors of such carbonyl compounds. Thus, "smog" contaminated air is believed to contain appreciable quantities of carbonyl compounds. Such contamination may be effectively removed by treatment with the present resinous materials in granular form. The resinous composition of this invention containing carbonyl-reactive radicals in its molecular structure provides a carbonyl-reactive agent, suitable for removing the carbonyl-containing compounds from the raw products of the above processes or for reducing the contamination of gases containing the same. Furthermore, the addition product of the carbonyl compound with the present resinous composition may be readily regenerated by suitable treatment, as hereinafter more fully described, to thereby not only regenerate the carbonyl-exchange resin, but also to release the carbonyl compounds from the spent exchange resin for recovery thereof.

The principal object of the present invention is to provide a resinous composition containing carbonyl- reactive radicals in its molecular structure, capable of reacting with aldehydes and ketones to form a regeneratable complex therefrom. Another object of this invention is to provide a solid carbonyl-exchange resin for the separation and recovery of aldehydes and ketones from various solutions thereof with other organic compounds, from aqueous solutions, or from gas mixtures. Still another object of the invention is to provide a carbonyl-exchange resin which may be readily regenerated for further reuse in the process.

In one of its embodiments, the present invention relates to a process for producing a resinous material containing recurring carbonyl-reactive radicals selected from the group consisting of hydrozino and amino-oxy radicals which comprises copolymerizing to a solid resinous state an ethylenically unsaturated, organic, nitrogenous compound containing at least one of said radicals with an unsaturated organic compound copolymerizable with said nitrogenous compound.

Another embodiment of this invention concerns a resinous material containing multiple radicals selected from the group consisting of hydrazino and amino-oxy, said resinous material being formed by copolymerizing at least one compound selected from the group consisting of an ethylenically unsaturated organic compound containing at least one of said radicals and an unsaturated organic compound copolymerizable with said first-mentioned organic compound to form a solid resinous copolymer.

Another embodiment of the invention relates to a method of separating a carbonylic compound from a mixture containing said carbonylic compound which comprises contacting said mixture with a solid resinous material formed by copolymerizing at least one compound selected from the group consisting of an ethylenically-unsaturated nitrogenous organic compound containing a radical selected from the group consisting of hydrazino and amino-oxy with an unsaturated organic compound copolymerizable with said first mentioned organic compound, thereafter treating the resulting resinous material with an aqueous caustic solution with sufficient strength and at reaction conditions sufficient to regenerate the amino groups of said resinous material and liberate the carbonyl compound reacted with said resinous material.

The treating agent of the process of this invention, capable of removing organic compounds containing a carbonyl group from a mixture of the same with an inert material is herein referred to as a carbonyl-exchange resin of sufficient molecular weight to exist in the form of a solid material and containing multiple carbonyl-reactive groups selected from hydrazino and amino-oxy radicals. These resins are conveniently formed by polymerizing an unsaturated organic compound in which the unsaturation occurs as ethylenic, or dienic double bonds and containing at least one of a group of carbonyl-reactive radicals selected from hydrazino and amino-oxy or by copolymerizing a compound of the foregoing type, that is, an unsaturated organic compound containing either a hydrazino or amino-oxy radical, or both, with a different unsaturated organic compound which is copolymerizable with the aforementioned class of compounds containing the carbonyl-reactive radicals. Thus, the resinous materials contemplated herein may be formed either by a polymerization process involving only reactants containing the carbonyl reactive radicals or by a copolymerization reaction between a compound containing said radical and a different unsaturated organic molecule. In the product formed by means of the first type of reaction, comprising only compounds containing carbonyl reactive radicals, the intramolecular spacing between the hydrazino and/or amino-oxy radicals present in the resulting resinous product is closer and the resinous treating agent is consequently capable of reacting with a greater molecular ratio of carbonyl compound per "mole" of the resin (i. e. per mol of monomer) than in the case of mixed monomer product; however, it may be more advantageous, aside from the cost of the resulting resinous treating agent, to utilize a mixed monomer-type resin to provide the proper spacing between the hydrazino and/or amino-oxy radicals and to thereby produce a resin of sufficient reactivity to react with the carbonyl compound, particularly when the latter is a large molecule which would otherwise be incapable of reacting completely with the available hydrazino and/or amino-oxy radicals present in the resin.

Typical illustrative examples of copolymerizable compounds containing hydrazino and amino-oxy radicals and containing ethylenic or polyenic unsaturation, which compounds may be polymerized by themselves to form the present resinous composition or copolymerized with other ethylenically unsaturated compounds to form resinous compositions containing multiple hydrazino and/or amino-oxy radicals in accordance with the process of the present invention, are divisable into several subgroups, including the unsaturated hydrocarbon substituted hydrazines and oxyamines, the amide derivatives of the hydrazines, known as the hydrazides in which the unsaturation occurs in the radical attached to the hydrazino linkage and the carboxamide derivatives of the hydrazines which contain an unsaturated hydrocarbon substituent on the acid-derived portion of the resulting hydrazide. Typical representative compounds in the first mentioned group include vinylhydrazine, allylhydrazine, propenylhydrazine, 1-butenylhydrazine, 2-butenylhydrazine, 3-butenylhydrazine, isobutenylhydrazine, 2-hydrazino-butadiene, the various isomeric butenyl-substituted hydrazines and the higher molecular weight alkenylhydrazine homologs containing up to about 8 carbon atoms in the alkenyl group, including the various octenylhydrazine isomers. The alkenyl radical may be substituted on an aryl nucleus, which in turn may be substituted on one of the nitrogen atoms of the hydrazine linkage, such as vinylphenylhydrazine, divinylphenylhydrazine, alpha-methylvinylphenylhydrazine, vinylnaphthylhydrazine, allylphenylhydrazine, propenylphenylhydrazine and others containing up to about 4 carbon atoms in the alkenyl-substituted arylhydrazine compounds, including the various position isomers on the aryl nucleus. Typical representative compounds included within the present designation of unsaturated hydrazides are, for example, acrylylhydrazide, crotonylhydrazide, sorbichydrazide, linoleylhydrazide, cinnamylhydrazide, maleichydrazide, pyromucylhydrazide, pyrroylhydrazide, etc. Typical representative hydrazide compounds of normally saturated acids containing an unsaturated hydrocarbon substituent in its structure include such compounds as vinylbenzoylhydrazide, allylbenzoylhydrazide, vinylsalicylylhydrazide, allylsalicylylhydrazide, vinylsuccinamylhydrazide, vinyltoluylhydrazide, alphavinyltoluylhydrazide, vinylxylylhydrazide, vinylphthalamidohydrazide, and vinylphthalimidohydrazide. Of the above it is generally preferred to employ the alkenyl-substituted phenyl hydrazines containing a vinyl or allyl substituent on the aryl nucleus such as p-vinylphenylhydrazine or 2,4-divinylphenylhydrazine which are generally the most readily available of the various unsaturated hydrazines and the polymers thereof or their copolymers with other ethylenically unsaturated polymerizable compounds are highly effective carbonyl-reactive resinous materials for the process of the present invention.

Compounds containing amino-oxy groups are designated as hydroxylamine derivatives (being the oxyethers formed by etherification of hydroxylamine) and in general the monomers utilizable in the present polymerization or copolymerization process for the preparation of the present resinous compositions are also substituted by ethylenically or polyenically unsaturated radicals on the organic residue or radical attached to the oxylinkage. Thus, the vinyl-ether of hydroxylamine (ethenoxyamine) allylhydroxylamine (propenoxyamine), the various butenoxy and butadienoxyamines, pentenoxy- and pentadienoxyamine, and homologs thereof containing up to about 8 carbon atoms, including octenoxy- and octadienoxyamines represent typical amino-oxy derivatives containing an unsaturated hydrocarbon radical attached to the amino-oxy group. Similarly, the amino-oxy radical may be attached through a phenyl or phenylene group to an unsaturated hydrocarbon substituent on the aryl nucleous, illustrated for example by o-vinylphenoxyamine, 1,4-divinylphenoxyamine, as well as numerous other ethylenically and dienically unsaturated ethers of hydroxylamine. The nitrogenous monomer containing an amino-oxy or hydrazino radical may also contain both of said groups in the same molecule, represented, for example by the compound: 2,6-divinyl-4-hydrazinophenyloxyamine.

As hereinbefore indicated, other polymerizable, ethylenically or dienically unsaturated monomers may be copolymerized with the monomer containing the oxyamine and/or hydrazino radical to form heterogeneous copolymers whose properties, and particularly the ability of the resulting resin to react with carbonyl compounds, are somewhat different from the homopolymers of the hydrazines and oxyamines themselves.

Suitable ethlenically or dienically unsaturated monomers utilizable in the copolymerization type of reaction to form a heterogeneous copolymer containing the hydrazino and/or oxyamine groups introduced by virtue of the monomer containing such radicals utilized in the copolymerization reaction may be selected from the relatively broad group of organic compounds having the essential characteristic that they contain at least one ethylenic double bond in their molecular structure, including such compounds as the unsaturated fatty acid amides and esters, the maleates, the vinyl alcohol esters, the vinyl halides and vinyl ethers, the fumarates, acrylates, methacrylates, acrylamides, acrylonitrile derivatives, the itaconates, the N-vinyl imides, the hydrocarbon monomers, including the aliphatic olefins, diolefins, and polyolefins, the olefinically-substituted aromatic hydrocarbons and cycloolefins, such as styrene and alpha-methyl styrene, the divinyl-substituted benzenes, the alkyl-substituted styrenes, the vinyl-naphthalenes, the vinyl- and polyvinyl-substituted diphenyls and the halogen, nitro, cyano and amino derivatives of the above general classification of compounds. Typical individual organic compounds utilizable within the above broad classification include such compounds as vinyl acetate, vinylchloride, vinylfluoride, vinylidene chloride, vinylidene fluoride, trifluoro-chloro-ethylene, tetrafluoro-ethylene, divinyl ether, alpha-chloroacrylic amide, beta-cyanocrylic amide, allyl-chloride, allylmethyl-ether and other allylakyl ethers, allylacetate, allylacrylate, diallylphthalate, diallylsuccinate, diallylether, the alkyl ethers of acrylic acid such as methylacrylate, methyl methacrylate, methyl-alpha-chloroacrylate, methyl-beta-cyano-acrylate, dimethylmaleate, dimethylfumarate, monochlorostyrene, dichlorostyrene, trichlorostyrene, vinylchloronaphthalene, dimethylstyrene, divinylbenzene, phenylstyrene, phenylethylstyrene, cyclohexylstyrene, etc., mono- and dicyanostyrenes, cyanomethylstyrene, and other specific compounds within the above general classes. In general, it is preferred that the ethylenically unsaturated monomer copolymerized with the unsaturated hydrazine and/or oxyamine-substituted monomer be free of carbonyl groups, such as formyl and keto groups which would otherwise react with the latter class of monomers and thereby reduce the tendency of the monomer to form a solid resinous material. It is to be emphasized that in the copolymerization or polymerization reaction to form the resinous product one or more classes of monomers may be present in the reaction mixture to form products in which the hydrazino and/or amino-oxy groups are different in spacial relationships from each other. Thus, a mixture of alpha-methylstyrene, divinyl-benzene and 1 or more of the hydrazino-substituted styrenes may be copolymerized in a common reaction mixture to form a heterogeneous polymer thereof having the hydrazino groups spaced at relatively wide intervals and hence, in more reactive positions because of greater freedom to react.

The polymerization of the monomer reactants for the production of a solid resinous material may be effected by thermal means, that is, in the absence of a catalytic agent, but it is generally preferred that a catalyst of a peroxide, azo, or other free radical type be incorporated into the reaction mixture, for example, in amounts of from about 0.1 to about 2% by weight of the monomers charged into the reaction mixture, in order to reduce the tendency of the monomers to copolymerize into highly colored resinous products which may be obtained by thermal polymerization. Suitable catalytic agents which provide free radicals in the reaction mixture include the aliphatic acyl peroxides and hydroperoxides such as acetyl peroxide, butyryl peroxides, tert-butyl hydroperoxide, lauryl peroxide, stearyl peroxide, etc.; peroxides of the aromatic acid series such as benzoyl peroxide and cumene hydroperoxide; ozone, and the ozonides; inorganic superoxides, such as calcium or barium peroxide, sodium peroxide etc.; the persulfates and perborates; mixed radical organic peroxides, such as acetyl-benzoyl peroxide and other compounds within the broad groups outlined above. Some of the preferred catalysts utilizable in the present process are tert-butyl hydroperoxide, cumene hydroperoxide and benzoyl peroxide, the radicals of which may generally be retained within the final resinous composition without reducing the effectiveness of the resin for its intended purposes.

The polymerization and copolymerization reactions involved in the present process are carried out at temperatures generally within the range of from about 25° to about 85° C. when utilizing a catalyst of the type mentioned above and at temperatures within the range of from about 50° to about 150° C. when the reaction is effected by thermal means, that is, in the absence of a catalytic agent. The catalytic reaction is preferred, however, since under conditions necessary to induce thermal reaction, the hydrazine and oxyamino groups may themselves undergo free-radical decomposition. Depending upon the molecular size of the monomer entering into the reaction for the production of a heterogeneous copolymer-type resin, the molar ratio of the monomer containing a hydrazino and/or oxyamine radical to the monomer copolymerizable therewith may be varied within the range of from 0.1 to 1 to about 5 to 1 or higher. Generally, ratios of less than 0.1 to 1 are not preferred for the reason that the hydrazino and/or oxyamino radicals in the resulting resin are too widely spaced to make the use of such resins practical in an economically feasible separation process. It has been found that the lower the temperature and the longer the polymerization reaction time, the higher the molecular weight of the resulting resinous product, the higher its melting point, the less its solubility in various solvents. The reaction time usually varies within the range of from about one-half to about 6 hours, although no definite limits can be prescribed for the reaction which is also dependent upon other properties desired in the final product and the nature of the reacting components, especially the amount and kind of catalyst.

Polymerization of the oxyamine and hydrazine derivatives or copolymerization thereof with other ethylenically unsaturated monomers may be effected by several alternative methods, including emulsion polymerization, usually in the presence of a peroxide-type catalyst; or suspension polymerization, usually in an inert solvent with the aid of an acid-type catalyst. The former method of polymerization is generally preferred when copolymers of the oxyamine or hydrazine derivative with other ethylenically unsaturated monomers are desired, while the latter type of polymerization method is more effective when a monomer containing an oxyamine or hydrazino radical is polymerized with itself to form the resinous polymer thereof. In a typical emulsion polymerization, the oxyamine- or hydrazine-substituted organic compound is emulsified in aqueous solution by the addition of a surface active agent thereto, such as an ordinary sodium soap (for example, sodium oleate, sodium linoleate or other water-soluble detergent) and the catalyst, if utilized, is added to the resulting emulsion, followed by polymerization at the desired reaction temperature, usually at temperatures from about 25° to about 85° C. In the suspension-type polymerization process, the monomer containing one or more oxyamino and/or hydrazino groups is dissolved in an inert solvent, such as a hydrocarbon, exemplified, for example, by benzene, toluene, xylene, normal heptane, cyclohexane etc. or a saturated halogen-containing hydrocarbon such as carbon tetrachloride, trichloroethane etc., followed by the addition to the resulting solution of a monomer and an acid-type catalyst, preferably dissolved in an inert solvent therefor, such as benzene, etc. The acid-type catalyst may be mineral acid or a Friedel-Crafts metal halide catalyst, such as aluminum chloride, tin chloride, zinc chloride, ferric chloride etc. The amount of catalyst utilized in the emulsion-type polymerization reaction may vary from about 0.1% to about 2% by weight of the monomer reactants, while in the acid-catalyzed suspension type polymerization process, the amount of catalyst required to effect the desired polymerization may be from about 0.1% to about 5% by weight of the reactive monomer or monomers.

One of the preferred methods of preparing the present carbonyl-reactive resin in a form which provides maximum surface area for contact with the solution of carbonyl compound for the removal of the latter compound therefrom is resin formed by incorporating certain "blowing" agents into the resin as it is formed and thereafter melting the resin and heating the same to the temperature at which the "blowing" agent expands the volume of the resinous material. Typical of such blowing agents is ammonium chloride, hexamethylene tetramine and others well-known in the art.

One of the preferred methods for removing carbonyl-containing compounds from mixtures with inert organic compounds or in aqueous solution, as for example, an aldehyde or ketone-contaminated mixture of organic compounds, such as an alcohol containing the aldehyde or ketone, comprises passing the mixture through a stationary bed of the carbonyl-reactive resin, the bed being composed of particles packed into a vertical column through which the contaminated mixture may be passed in either upwardly or downwardly flowing direction. As the contaminated mixture flows through the bed of resin, usually made up of particles of a size range of from about 50 to about 5000 microns in diameter, the carbonyl-containing compound is removed from the mixture and retained within the structure of the resin by reaction of the hydrazino and/or oxyamino radicals in the resin with the carbonyl group of the aldehyde or ketone present within the mixture of organic compounds used as charging stocks. When the resin has absorbed its maximum theoretical quantity of carbonyl compound, it may be readily regenerated by passing an acid, preferably a mineral acid, such as hydrochloric, sulfuric or nitric acid as a dilute aqueous solution through the bed of spent resin and draining from the bed of resin the resulting solution containing the carbonyl compound, if the latter is soluble in water. The regeneration is preferably effected at a temperature of from about 20° to about 80° C. and may be followed by caustic washing to regenerate the bed of resin and reconstitute the oxyamine and hydrazino salt groups to their free amino-oxy and hydrazino radicals.

The present invention is further illustrated with respect to several of its embodiments in the following examples, which are provided herein merely for illustrative purposes and not for defining the scope of the invention.

Example I

Vinylphenyl hydrazine (styryl hydrazine) is polymerized in an aqueous emulsion thereof to produce a hard, solid resinous product which may be crushed into smaller particles and utilized as a carbonyl-reactive treating agent in accordance with the present invention. One mol (134 grams) of vinylphenyl hydrazine is stirred into 10 volumes of an aqueous solution of sodium oleate in distilled water (0.3% solution) at 25° C., followed by the dropwise addition to the resulting emulsion of 1.3 grams (10% by weight of the vinylphenyl hydrazine) of potassium persulfate, the resulting emulsion being stirred for an additional 6 hours as resin formation continues to take place. Upon the addition of sodium chloride to the aqueous emulsion the resin appears in the form of a granular solid which is removed by filtering the resulting mixture, followed by washing the polymerized resin with alcohol and then with water. After drying the solid resin for 3 hours, it is broken into finer particles, the resulting particles sifted to remove dust and thereafter sieved to separate particles larger than 500 microns in diameter.

The above resin when packed into a vertical pipe of two inches in diameter, effectively removes acetaldehyde from a 2% aqueous solution thereof, when the latter solution is passed at 40° C. through the column at a rate of flow of 2 liquid hourly space velocity (2 volumes of solution per volume of resin per hour). After several hours of continuous flow through such a bed, the aqueous effluent flowing from the bottom of the tower begins to show the presence of acetaldehyde therein; the flow of aqueous acetaldehyde solution is then stopped and the column drained. On the basis of the calculated acetaldehyde charged through the tower, the resin absorbs approximately 0.35 mol of acetaldehyde per mol of vinylphenyl hydrazine in the resin. The aqueous effluent from the column, up to the point that the resin became spent, contained no detectable quantity of acetaldehyde in the effluent solution.

The column of resin may be regenerated by filling the voids between the resin particles in the column with a 10% aqueous solution of hydrogen chloride at 50° C., allowing the column to stand for a short while, draining the acetaldehyde containing acid solution from the column and thereafter again filling the column with a 10% aqueous ammonium hydroxide solution, followed by again draining the column. The resin regenerated in this manner is again effective for removing aldehydes and ketones from solutions containing the same.

Example II

A carbonyl-exchange resin may be formed by copolymerizing a mixture of 50 parts 3,5-dihydrazino-styrene, 50 parts styrene, and 1 part divinylbenzene in an aqueous emulsion, catalyzed by a peroxide-type polymerization catalyst, in a manner similar to the polymerization of Example I, above, the solid resinous material being produced in the form of a hard, resinous mass which may be broken into smaller particles by pulverization, preferably, particles having a size range of from about 250 to 1000 microns. The resulting particles are placed in the vertical column of Example I through which an aqueous soluton of 20% ethyl alcohol, 2% benzyl alcohol, and 2% of benzaldehyde is passed at a 2 liquid hourly space velocity until benzaldehyde starts to appear in the aqueous effluent from the column. This resin, containing 2 benzaldehyde-reactive hydrazino groups per mol of styrene in the final resinous product is capable of absorbing 0.85 mol of aldehyde per mol of dihydrazino styrene in the structure of the resin.

The method of regeneration employed in Example I above, that is, by passing a warm aqueous solution of hydrochloric acid, followed by a dilute aqueous ammonium hydroxide solution through the bed of spent resin, is also effective in regenerating the present resinous material and the treatment restores the aldehyde-removing capacity of the resin.

Example III

A copolymer resin comprising a copolymer of para-amino-oxystyrene and acrylonitrile formed by an acetyl peroxide catalyzed copolymerization of an equimolar mixture of these monomers in aqueous emulsion forms a solid resin capable of absorbing approximately 0.3 mol of an aldehyde, such as formaldehyde, per molar equivalent of the amino-oxy styrene in the resin from an aqueous solution of formaldehyde passed through the column at approximately 50° C. The resin may also be utilized to remove ketones from aqueous solution or from an alcohol solution of the ketone. Thus, for example, acetone may be removed from ethyl alcohol, the resin being capable of absorbing 0.3 molar equivalent of acetone per mol of the amino-oxystyrene in the resin.

I claim as my invention:

1. A method of separating a carbonylic compound from a mixture thereof with a material which is inert in the presence of compounds containing hydrazino and amino-oxy radicals which comprises contacting said mixture with a solid resin formed by copolymerizing monomer (A) with monomer (B), each of said monomers containing a copolymerizable ethylenic double bond, at least one of said monomers containing a radical selected from the group consisting of hydrazino and oxyamino, said ethylenic double bond being the sole copolymerizable functional group in each of said monomers (A) and (B), and said radical being the sole carbonyl-reactive functional group in said monomers (A) and (B), and thereafter separating a spent resin comprising the addition product of said solid resin and the carbonylic compound from said inert material.

2. The process of claim 1 further characterized in that said spent resin is treated with a dilute aqueous solution of a mineral acid at a temperature not substantially in excess of a temperature sufficient to decompose the condensation product formed by contacting said resin with said carbonylic compound, followed by treatment of the acid-treated resin with a base.

3. The process of claim 2 further characterized in that said base is an aqueous solution of ammonium hydroxide.

4. The method of claim 1 further characterized in that said monomers (A) and (B) are different.

5. The method of claim 4 further characterized in that said monomers (A) and (B) each contain a radical selected from the group consisting of hydrazino and oxyamino.

6. The method of claim 4 further characterized in that only one of said monomers (A) and (B) contains a radical selected from the group consisting of hydrazino and oxyamino.

7. The process of claim 1 further characterized in that one of said monomers (A) and (B) is vinylphenylhydrazine.

8. The process of claim 1 further characterized in that one of said copolymerizable monomers (A) and (B) is divinylphenylhydrazine.

9. The process of claim 1 further characterized in that one of said copolymerizable monomers (A) and (B) is dihydrazino styrene.

References Cited in the file of this patent

UNITED STATES PATENTS

| | | |
|---|---|---|
| 2,561,814 | Novotny et al. | July 24, 1951 |
| 2,764,570 | Kowolik et al. | Sept. 25, 1956 |

FOREIGN PATENTS

| | | |
|---|---|---|
| 578,598 | Great Britain | July 4, 1946 |